(12) United States Patent
Brown

(10) Patent No.: US 8,566,294 B2
(45) Date of Patent: Oct. 22, 2013

(54) DATABASE ELEMENT VERSIONING SYSTEM AND METHOD

(75) Inventor: David Lawrence Brown, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 12/344,734

(22) Filed: Dec. 29, 2008

(65) Prior Publication Data

US 2010/0169288 A1 Jul. 1, 2010

(51) Int. Cl.
*G06F 17/00* (2006.01)

(52) U.S. Cl.
USPC ..... 707/695; 707/687; 707/694; 707/E17.005

(58) Field of Classification Search
USPC ............ 707/695, 999.203, E17.005, 687, 694
See application file for complete search history.

(56) References Cited

U.S. PATENT DOCUMENTS

| | | | | |
|---|---|---|---|---|
| 5,649,200 | A * | 7/1997 | Leblang et al. ............... | 717/122 |
| 6,460,052 | B1 * | 10/2002 | Thomas et al. ............... | 707/695 |
| 6,598,059 | B1 * | 7/2003 | Vasudevan et al. .................. | 1/1 |
| 7,444,363 | B2 * | 10/2008 | Kruy et al. ............. | 1/1 |
| 7,836,028 | B1 * | 11/2010 | Agarwal et al. ............... | 707/695 |
| 2005/0138013 | A1 * | 6/2005 | Walker et al. ..................... | 707/3 |

OTHER PUBLICATIONS

Oracle Corporation, "Oricle XML DB Versioning, Oracle9i XML Database Developer's Guide—Oracle XML DB Release 2 (9.2)", Part No. A96620-02, downloaded from internet (http://download-west.oracle.com/docs/cd/B10501_01/appdev.920/a96620/xdb18ver.htm) Oct. 28, 2011, pp. 1-9.

\* cited by examiner

*Primary Examiner* — Fred I Ehichioya
*Assistant Examiner* — Shiow-Jy Fan
(74) *Attorney, Agent, or Firm* — Holland & Knight LLP; Brian J. Colandreo, Esq.; Jeffrey T. Placker, Esq.

(57) ABSTRACT

This disclosure relates to database systems and, more particularly, to database systems with version controlled data. A version controlled database program resides on a computer readable medium, having a plurality of instructions stored thereon, which, when executed by a processor, cause the processor to perform operations. The operations include defining a version object software layer. The version object software layer may be configured to read and write data of a version controlled database to a physical storage medium, maintain one or more versions of at least one element of the data, and provide access to the data. The operations may also include defining a database management software layer. The database management software layer may be configured to read and write data to the version object software layer and provide a database access interface for accessing the data.

16 Claims, 7 Drawing Sheets

DATABASE ELEMENT VERSIONING SYSTEM AND METHOD

TECHNICAL FIELD

This disclosure relates to database systems and, more particularly, to database systems with version controlled data.

BACKGROUND

Databases are ubiquitous in computing. They are used in many applications, spanning the range of computer software. They are used to store lists of clients, handle business transactions, and aid in product development, and perform many other functions. They serve as a data repository for almost any application that requires storage of data.

However, it is difficult to experiment with the contents of a database without interfering with the work of others using the database. For example, a product development group may use a database as a repository for product requirements. A product developer may wish to modify and experiment with the product requirements without disturbing the work of other developers. To do so, the developer must create a private version of the data so that his or her changes do not interfere with the data used by the other developers. A private version or branch of the data would serve this end. But currently there is no way to create a private version or branch within a database for the product developer to use. Instead, the product developer must create a copy of the entire database, perform his or her experiments and modifications, and manually copy any changes back into the main database. This process is arduous and error prone.

SUMMARY OF THE DISCLOSURE

In an embodiment, a version controlled database program resides on a computer readable medium. The version controlled database program has a plurality of instructions, which, when executed by a processor, cause the processor to perform operations. The operations include defining a version object software layer. The version object software layer is configured to read and write data of a version controlled database to a physical storage medium, maintain one or more versions of at least one element of the data, and provide access to the data including the one or more versions of the at least one element of the data. The operations also include defining a database management software layer. The database management software layer is configured to read and write the data to the version controlled database via reading and writing the data to the version object software layer, and provide a database access interface for accessing the data in the version controlled database.

One or more of the following features may be included. The version object software layer may include one or more data views that provide access to the versions of the data in the version controlled database. The database management software layer may read and write to the version object software layer via the one or more data views.

The version object software layer may also read and write data to the physical storage medium by performing file I/O operations. The database management software layer may read and write the data to the physical storage medium by performing versioning-compatible save operations. A versioning-compatible save operation may save data to certain and repeatable locations.

The database management software layer may read and write data to the version controlled database via file I/O operations sent to the version object software layer, or to a second physical storage medium, where the second physical storage medium is used for temporary storage of the data in the version controlled database.

The version object software layer may further store data tables of the version controlled database on the physical storage medium.

In another embodiment, a method of accessing data in a version controlled database includes reading and writing data of a version controlled database to a physical storage medium. One or more versions of the data are stored on the physical storage medium. The method also provides access to the data via a database access interface, and provides access to the one or more versions of the data via a data version interface.

One or more of the following features may be included. The data version interface may include one or more data views that display particular versions of the data. Reading and writing data may include reading and writing to the one or more data views. Reading and writing data may include reading and writing data to the physical storage medium by performing file I/O operations. Reading and writing data to the physical storage medium may include performing versioning-compatible save operations that read and write the data to certain and repeatable locations. Reading and writing the data may also include reading and writing via raw I/O operations sent to a second physical storage medium, where the second physical storage medium is used for temporary storage of the data in the version controlled database. The method may also store data tables of the version controlled database on the physical storage medium.

The details of one or more implementations are set forth in the accompanying drawings and the description below. Other features and advantages will become apparent from the description, the drawings, and the claims.

BRIEF DESCRIPTION OF THE DRAWINGS

Like references in the drawings denote like elements.

DETAILED DESCRIPTION OF THE PREFERRED EMBODIMENTS

Figure 1:
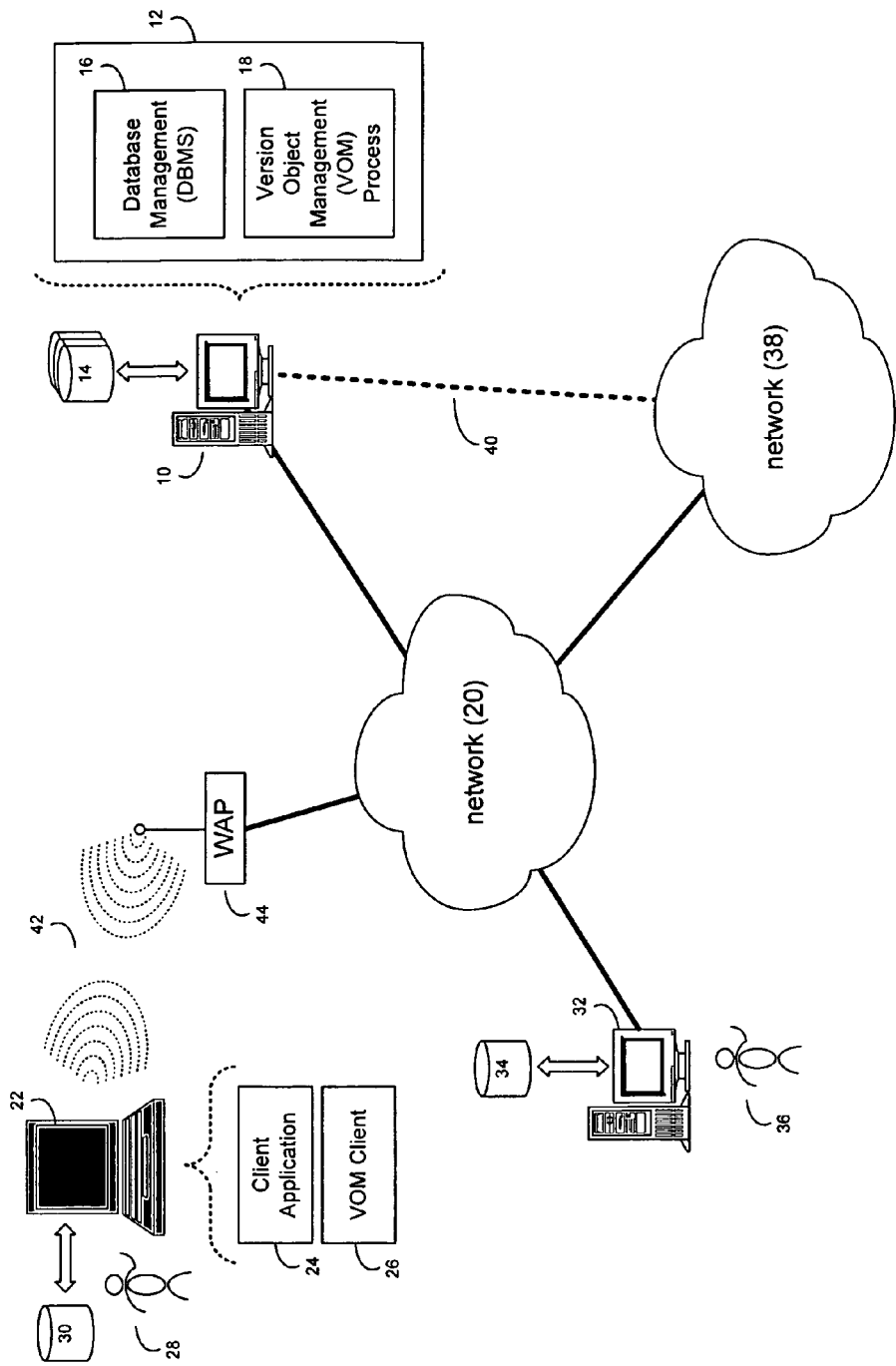
FIG. 1 is a diagrammatic view of a version controlled database system, including a database management system ("DBMS") process and a version object management ("VOM") process coupled to a distributed computing network.

System Overview:

FIG. 1 depicts a computing environment that incorporates a version controlled database. Server computer 10 may provide version controlled database services to the computing environment. For example, server computer 10 may execute version controlled database process 12. Server computer 10 may also include physical storage medium 14, which may store data of the database. Physical storage medium 14 may be a hard disk drive; a solid state drive; a tape drive; an optical drive; a RAID array; a random access memory (RAM); a read-only memory (ROM), or an array or group of any type of physical storage medium. Although FIG. 1 depicts the systems and methods described herein as coupled to a distributed computing network, one skilled in the art will recognize that the systems and methods could be implemented on many types of computing infrastructures including, but not limited to: client/server, single processor, distributed processor, and clustered processor infrastructures, for example.

Version controlled database process 12 may include a database management ("DBMS") process, such as DBMS process 16. Version controlled database process 12 may also include a version object management ("VOM") process, such as VOM process 18, which may also run on server computer 10.

Server computer 10 may be connected to network 20 (e.g., the Internet or a local area network). Examples of server computer 10 may include, but are not limited to: a personal computer, a server computer, a series of server computers, a mini computer, and a mainframe computer. Server computer 10 may be a web server (or a series of servers) running a network operating system, examples of which may include but are not limited to: Microsoft® Windows® XP Server; Novell Netware®; or Redhat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvales in the United States, other countries, or both).

As will be discussed below in greater detail, version controlled database process 12 may include instructions stored on physical storage medium 14, which, when executed by a processor of server computer 10, cause the processor to perform operations that provide version controlled database services. The operations may define a version object software layer, such as VOM 18, for example. The version object software layer may be configured to read and write data of the version controlled database to physical storage medium 14. VOM process 18 may also maintain one or more versions of at least one element of the data, and provide access to the data. The operations may also define a database management software layer, such as DBMS process 16. DBMS process 16 may be configured to read and write data to the VOM process 16 and/or physical storage medium 14, and provide a database access interface for accessing the data.

The instruction sets and subroutines of version controlled database process 12, which may include one or more software modules, and which may be stored on physical storage medium 14 coupled to server computer 10, may be executed by one or more processors (not shown) and one or more memory architectures (not shown) incorporated into server computer 10. Physical storage medium 14 may include but is not limited to: a hard disk drive; a solid state drive; a tape drive; an optical drive; a RAID array; a random access memory (RAM); and a read-only memory (ROM).

The instruction sets and subroutines of version controlled database process 12 may be generated through the use of a compiler, such as the IBM® XL compiler, the Visual Studio® compiler, or an assembler, for example (IBM is a registered trademark of International Business Machines Corporation in the United States, other countries, or both; Visual Studio is a registered trademark of Microsoft Corporation in the United States, other countries, or both). The instruction sets and subroutines may also be generated as scripts, such as JavaScript® scripts, or as other types of software code (JavaScript is a registered trademark of Sun Microsystems, Inc. in the United States, other countries, or both). In general, and as is known in the art, the instruction set and subroutines of version controlled database process 12 may be generated via any method of generating instruction sets and subroutines that may be executed by a processor.

Laptop 22 may execute client application 24. Client application 24 may be any application that accesses data in a database. Client application 24 may require laptop 22 to execute a database client, such as the DB2® client, for example. (DB2 is a registered trademark of International Business Machines Corporation in the United States, other countries, or both). Additionally/alternatively, client application 24 may include database access capability without the need for a separate database client executing on laptop 22.

Laptop 22 may also execute VOM client 26. VOM client 26 may be an application that allows user 28 to access particular versions of data managed by version controlled database process 12. VOM client 26 may also allow user 28 to create views, which will be discussed in greater detail below. The ClearCase® configuration management tool is an example of an analogous VOM application. (ClearCase is a registered trademark of International Business Machines in the United States, other countries, or both). However, the ClearCase tool is most commonly used to manage versions of source code. Using a tool like the ClearCase tool to compare today's large, optimized database files, and attempting to merge them is not feasible because a DMBS process may use optimized storage operations.

Client application 24 and VOM client 26 may be stored on storage device 30 coupled to laptop 22. Although not shown, client application 24 and/or VOM client 26 may also be executed by desktop computer 32 and stored on storage device 34, and accessed by user 36.

Physical storage medium 14 and storage devices 30, 34 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Various client electronic devices may be coupled to network 20. Examples of client electronic devices may include, but are not limited to: server 10, laptop 22, desktop computer 32, a personal digital assistant (not shown), a data-enabled, cellular telephone (not shown), a game console (not shown), and a dedicated network device (not shown). Users 28, 36 may access the various tools and applications, such as version controlled database process 12, client application 24, or VOM client 26, from any device connected to network 20 or network 38, or directly from the device on which the tool or application resides. Client electronic devices may be coupled directly to network 20, or may be indirectly coupled to network 20 through network 38. For example, server 10 may be indirectly connect to network 20 through secondary network 38, as illustrated by phantom link line 40.

The various client electronic devices may be directly or indirectly coupled to network 20 (or network 38). For example, desktop computer 32 is shown directly coupled to network 20 via a hardwired network connection. Laptop 22 is shown wirelessly coupled to network 20 via wireless communication channel 42 established between laptop 22 and wireless access point (i.e., WAP) 44, which is shown directly coupled to network 20. WAP 44 may be, for example, an IEEE 802.11a, 802.11b, 802.11g, 802.11n, Wi-Fi, and/or Bluetooth device that is capable of establishing wireless communication channel 42 between laptop 22 and WAP 44.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The various client electronic devices may each execute an operating system, examples of which may include but are not limited to a Microsoft Windows operating system, the Redhat Linux operating system, or a custom operating system.

Figure 2:
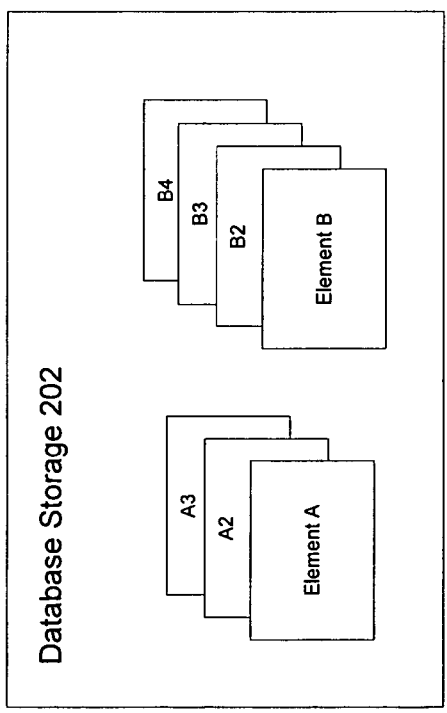
FIG. 2 is a diagrammatic representation of versions of data elements stored in database storage.

Version Controlled Database Process:

Version controlled database process 12 may provide database services that include version control of elements within the database. FIG. 2 is a block diagram that represents versions of elements stored within database storage 202. Database storage 202 may be an area of storage on a hard drive, or other physical storage medium such as physical storage medium 14. Database storage 202 may also be a file, a series of files, or any other means of storing data in a database. Database storage 202 may entirely occupy physical storage medium 14, occupy a portion of physical storage medium 14, or may span multiple physical storage media. As shown in the example in FIG. 2, database storage 202 contains two elements: element A and element B. However, database storage 202 may contain any number of elements. Element A and element B may be any artifact stored in a database. For example, element A and element B may be single elements of data, rows of data, columns of data, column definitions, row definitions, tables, data relations, or any other type of element that may be stored in a database.

Figure 3:
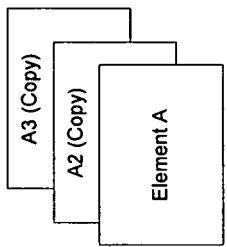
FIG. 3 is a diagrammatic representation of a type of versioning of a data element.

Various versions of element A and element B may be stored in database storage 202. As shown in FIG. 2, database storage 202 contains three versions of element A: namely A, A2, and A3; and four versions of element B: namely B, B2, B3, and B4. The various versions may be stored in various ways. In one embodiment, the various versions of each element may be copies of each element. For example, in FIG. 3, versions A2 and A3 may be copies of element A stored within database storage 202. Because versions A2 and A3 are different versions of element A, they may differ from element A in some way: they may contain different data, modified data, variations of data, etc. When a version of element A is accessed, version controlled database process 12 may retrieve and provide the appropriate modified copy of element A stored within database storage 202.

Figure 4:
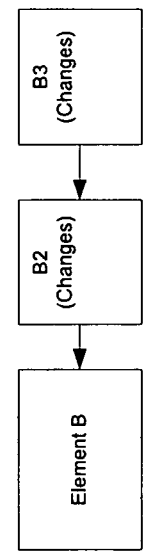
FIG. 4 is a diagrammatic representation of another type of versioning of a data element.

In another embodiment, the versions may be incremental and/or cumulative changes to a main element. For example, FIG. 4 shows element B as a main element. Version B1 is not necessarily a copy of element B. Rather, version B1 may be a set of changes to be applied to element B. So when version controlled database process 12 retrieves version B1, it may retrieve element B, apply the changes stored in version B1 to element B, and provide the element with the applied changes. The changes may be applied cumulatively. For example, version B2 may be a set of changes applied to version B1, which in turn may be applied to element B.

Figure 5:
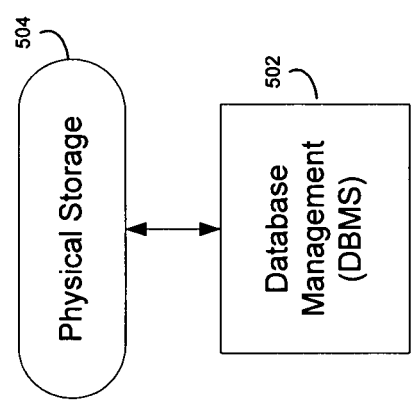
FIG. 5 is a block diagram of a typical database system.

FIG. 5 is a diagrammatic view of a typical database system. As shown, database management ("DBMS") process 502 interfaces with physical storage medium 504. In a typical database, DBMS process 502 provides a database access interface. DBMS process may, for example, provide an SQL language interface that allows a user to read and write data to the database using the SQL database programming language.

DBMS process 502 may also perform optimized storage operations. The optimized storage operations often access the physical storage medium (e.g. hard disk) directly and consist of low level block reads and block writes. The optimized storage operations do not always write data to the same place on disk. For example, if a user reads, modifies, and writes a data element to the database via DBMS process 502, DBMS process 502 may read the data element from one location, but may write it back to the physical medium at another location. Optimized storage operations are typically complex algorithms designed to optimize database operations that read from and write to a physical disk.

Figure 6:
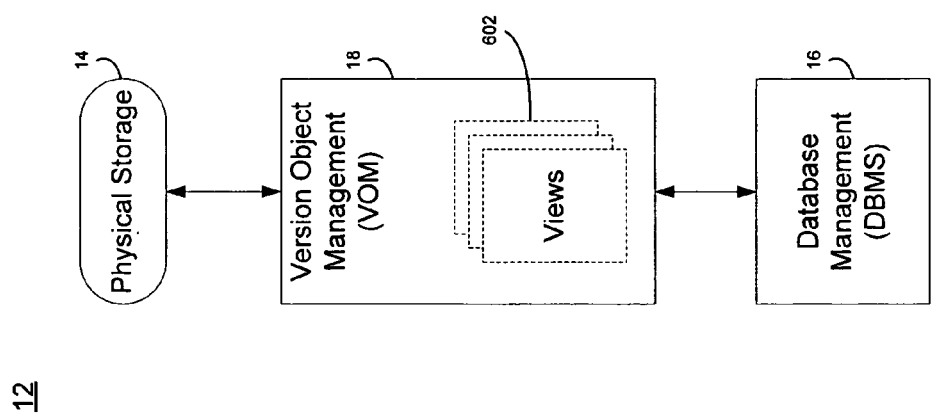
FIG. 6 is a block diagram of one embodiment of the version controlled database system.

FIG. 6 depicts an embodiment of the versioned database process of this disclosure. Version controlled database process 12 may include a version object software layer, i.e. VOM process 18. VOM process 18 may be configured to read and write data of a version controlled database to a physical storage medium 14. In the embodiment shown in FIG. 6, VOM process 18 interacts with physical storage medium 14. VOM process 18 may read, write, and store data and various versions of data on physical storage medium 14.

VOM process 18 may also maintain one or more versions of at least one element of the data on physical storage medium 14. VOM process 18 provides access to and management of the versions of database elements stored within database storage 202. VOM process 18 may also provide access to the data including the one or more versions of the at least one element of the data; VOM process 18 may allow a user or another process to create, modify, and/or delete versions of elements within the versioned database. VOM process 18 may also provide a file I/O interface and/or a view interface, so that DBMS process may access data elements via VOM process 18. Views, such as views 602, may provide access to versions of the data and elements within the database. Views 602 may also provide a configurable workspace that includes particular versions of the data and elements within the database. Views will be discussed below in greater detail.

Version controlled database process 12 may also include a database management software layer—database management ("DBMS") process 16, for example. DBMS process 16 may be a standard or modified DBMS process that provides a database access interface for accessing the data in the version controlled database. The database access interface or API may, for example, include a database programming language interface, such as a SQL language interface, that allows a user to read and write data to the database.

DBMS process 16 may also interact with VOM process 18; DBMS process 16 may be configured to read and write the data to the version controlled database by reading and writing data to VOM process 16, for example. As discussed, VOM process 18 may provide an interface that DBMS process 16 can use to read and write data to the database. The interface provided by VOM process 16, however, may not require the DBMS to save information via optimized storage operations.

Instead, DBMS process 16 may be modified to perform versioning-compatible save operations. For example, VOM process 18 may determine if a version of data has changed by comparing it to previous versions stored on the physical disk. If DBMS process uses optimized storage, it may write the data to different locations and VOM process 18 may not be able to perform an effective comparison. However, if DBMS process 16 performs a versioning-compatible save operation—i.e. DBMS process 16 saves the data to the same location, or to a repeatable location—VOM process 18 may be able to determine if the data has changed. The same location or repeatable location may be the same location within a file, the same location on a physical disk, or the same location in a memory device or storage device, for example. In general, a versioning-compatible save operation may save data without using inconsistent and unrepeatable save locations of an optimized save operation. This may allow VOM process 18 to retrieve, compare, and update versions of the data from repeatable and predicable locations within a file or storage device.

To illustrate the way a version controlled database may operate, users 28, 36 may want to write data to the versioned database. Users 28, 36 may send a write command (e.g. a SQL update command) to DBMS process 16. Upon receiving the command, DBMS process 16 may perform a versioning-compatible save operation to store the data to the database. DBMS process 16 may perform a versioning-compatible save operation, saving the data to VOM process 18. VOM process 18 may then store the data, using standard file or disk I/O operations, or other storage operations, to physical storage medium 14. As VOM process 18 stores the data, it will ensure that it is storing the appropriate versions of the data. As discussed, the versions of the data may be copies of the data, or main data elements with cumulative changes. Before performing the data write operation, users 28, 36 can also use VOM process 18 (and/or VOM client 26) to select the appropriate versions of the data, create new versions of the data, create branches, etc.

Figure 7:
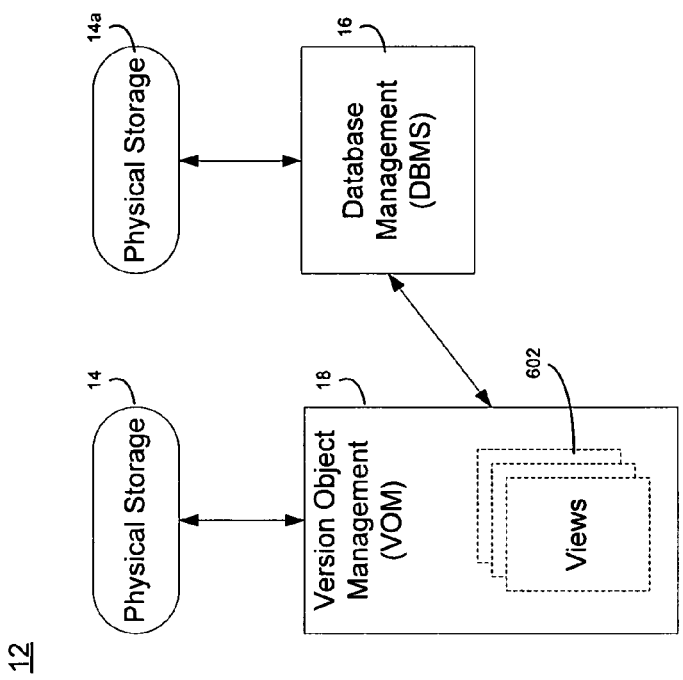
FIG. 7 is a block diagram of a second embodiment of the version controlled database system.

FIG. 7 depicts another embodiment of the invention. In some instances, it may be desirable to use a DBMS process 16 that performs optimized storage operations. Accordingly, the embodiment shown in FIG. 7 may use a DBMS process 16 that performs optimized storage operations. VOM process 18 may store the data in table files, via file I/O operations, on physical storage medium 14. DBMS process 16 may provide a database access interface, but may perform optimized storage operations and use physical storage medium 14a as a temporary data storage area or cache. Physical storage medium 14a may be a separate storage medium, or an area on physical storage medium 14. DBMS process 16 may also include an interface to VOM process 18. For example, when data on physical storage medium 14 is accessed, DBMS process 16 and/or VOM process 18 may copy data from physical storage medium 14 to physical storage medium 14a. DBMS process 16 may then use and manipulate the copied data on physical storage medium 14a; DBMS process may use the copied data on physical storage medium 14a to perform database operations such as queries, stores, updates, etc. When data access is complete (for example when a database session is closed by a user), DBMS process 16 and/or VOM process 18 may then copy the manipulated data from physical storage medium 14a back to physical storage medium 14. Once the data has been copied back to physical storage medium 14, the data on physical storage medium 14a may be discarded.

As another example, users 28, 36 may want to read, modify, and store data to the versioned database. Users 28, 36 may use VOM process 18 (and/or VOM client 26) to select appropriate versions of the data they want to read, modify, and store. Referring to FIG. 7, users 28, 36 may issue a read command (e.g. a SQL Select command) to DBMS process 16. VOM process 18 may then retrieve the appropriate versions of the data, sending the appropriate versions of the data to DBMS process 16. DBMS process 16 may then temporarily store the data on physical storage medium 14a. Users 28, 36 may then modify the data via DBMS process 16 (e.g. by sending database commands such as SQL commands to DBMS process 16), which will make the modifications to the temporary data stored on storage medium 14a. When the modifications are complete, users 28, 36 may issue a command to DBMS process 16 to store the data (and/or close the database session). DBMS process 16 may then send the modified data to VOM process 18. VOM process 18 will, in turn, store the modified data into the appropriate versions of the data permanently stored on physical storage medium 14. Once the modified data is stored back to physical storage medium 14, the temporary copy of the data on physical storage medium 14a may be discarded.

Figure 8:
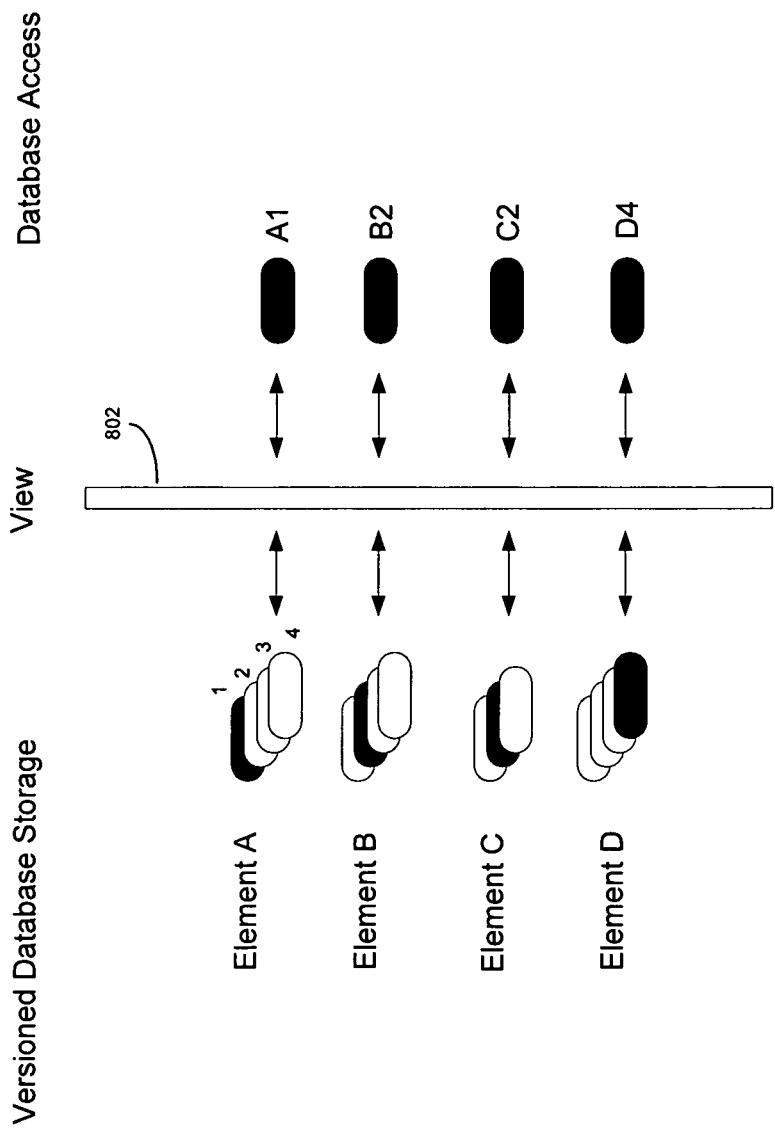
FIG. 8 is a diagrammatic illustration of a view of versioned data in the version controlled database system.

Users 28, 36 may use views to access versions of data in the version controlled database. A view may be a configurable environment that allows a user to select certain versions of data within the version controlled database. A view may also allow a user to create and access versions and/or branches within the version controlled database. Users 28, 36 may create views using VOM client 26 and/or VOM process 18. FIG. 8 represents a view that may be used by VOM process 18 to access versions of data. The left side of FIG. 8 represents database storage on a physical medium. The right side of FIG. 8 represents the versions of data elements (stored on the physical medium) that are accessed. As shown, the database storage of FIG. 8 contains four elements: A, B, C, and D. Elements A, B, and D each have four versions, while element C has three versions. A view is set up to access particular versions of the data. For example, view 802 allows access to version A1 of element A, version B2 of element B, version C2 of element C, and version D4 of element D. With this view in place, DBMS process 16 will read and write to versions A1, B2, C2, and D4 of the data elements. The other versions may not be accessed through this view. Other views, however, may be set up to access other versions of the data.

Figure 9:
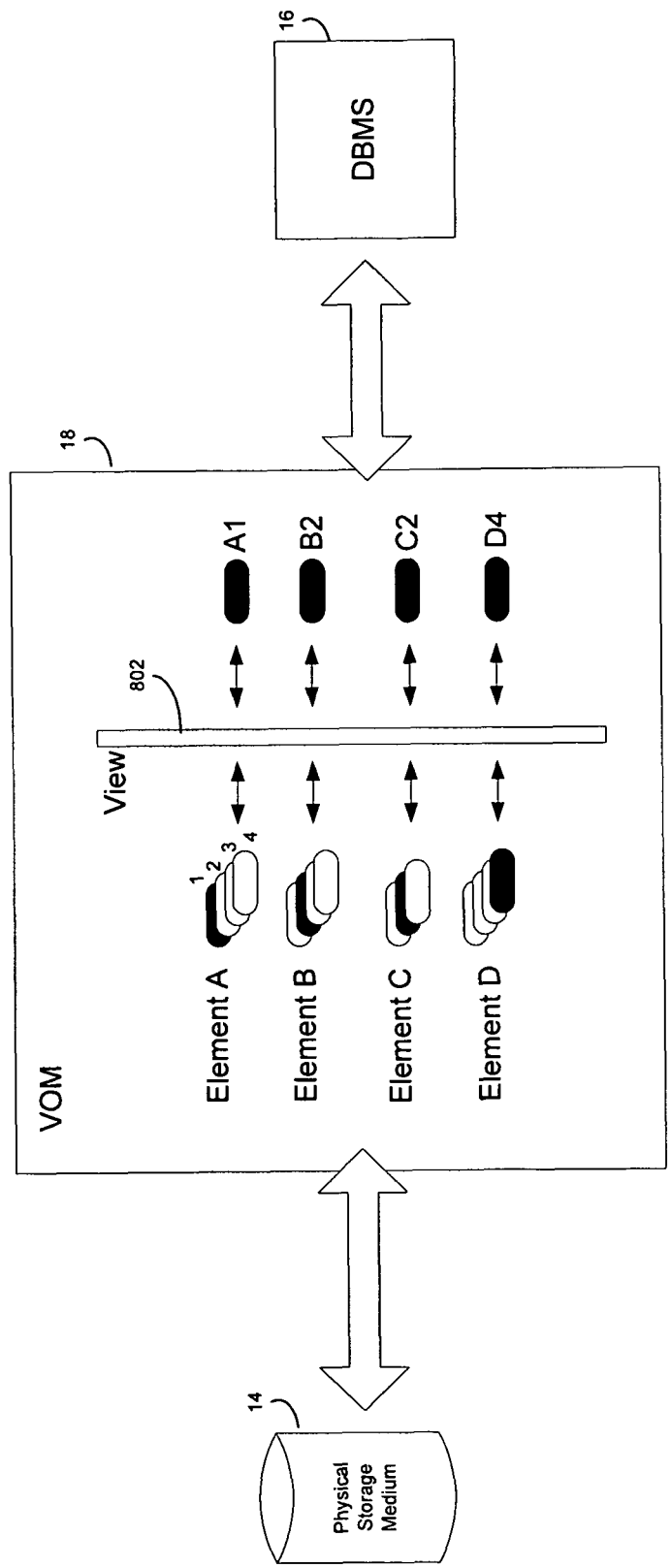
FIG. 9 is a block diagram of one embodiment of a version controlled database system including a view of versioned data.
Figure 10:
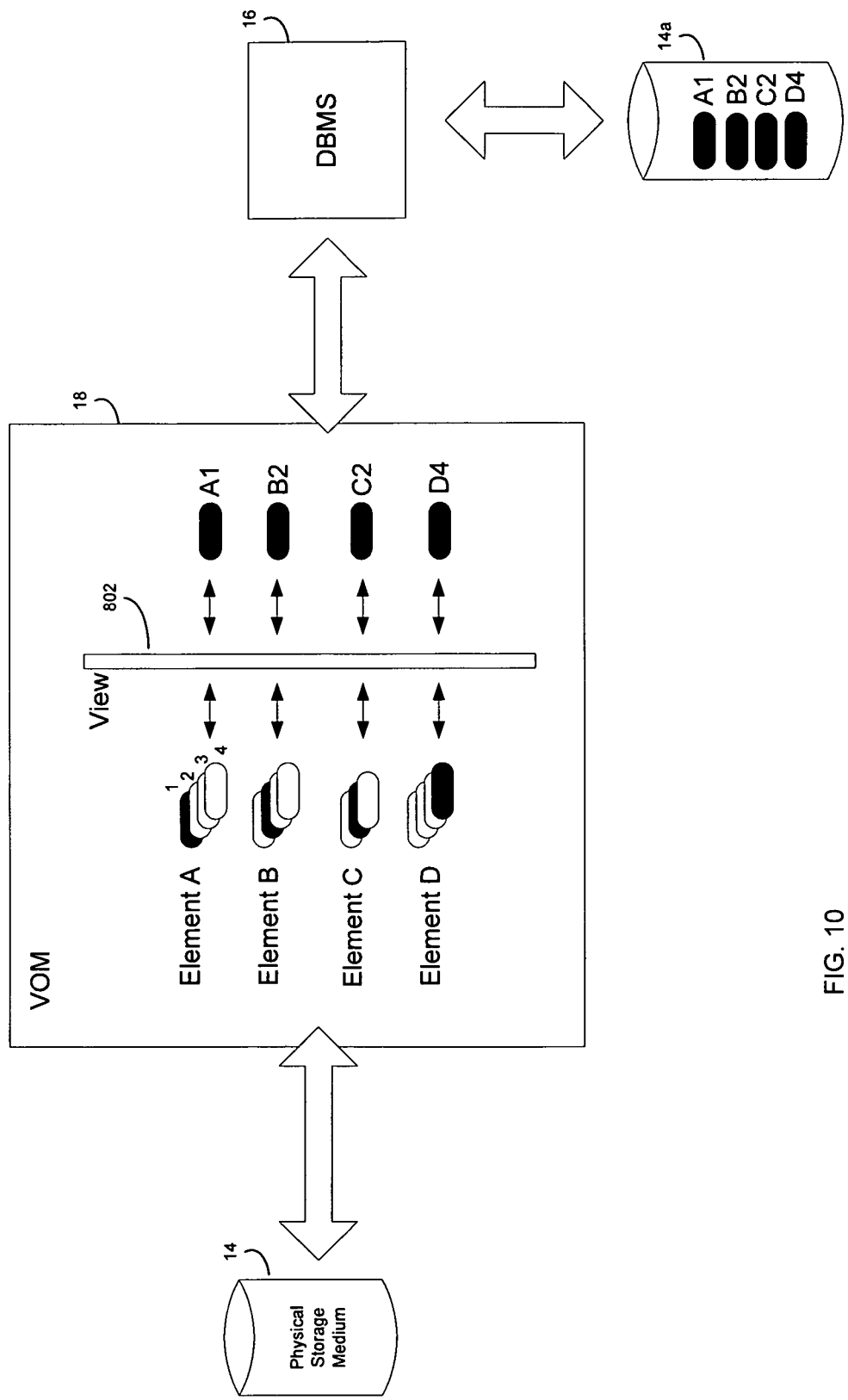
FIG. 10 is a block diagram of a second embodiment of a version controlled database including a view of versioned data.

FIG. 9 and FIG. 10 show a view operating within the version controlled database. In FIG. 9 all the versions of data elements A through D may be stored on physical storage medium 14. View 802 is set up to provide access to versions A1, B2, C2, and D4 of the data elements. Accordingly, in this example, when DBMS process 16 accesses the data elements, it may access versions A1, B2, C2, and D4.

FIG. 10 depicts another embodiment that incorporates a view. In FIG. 10, all the versions of data elements A through D may be stored in data tables on physical storage medium 14. View 802 is again set up to provide access to versions A1, B2, C2, and D4 of the data elements. In this example, when DBMS process 16 accesses data elements A through D, it receives versions A1, B2, C2, and D4. DBMS process 16 copies versions A1, B2, C2, and D4 to physical storage medium 14a which is used as a temporary storage or cache. When the modifications to the versions of the data elements are complete, DBMS process 16 sends the modified data back to VOM process 18, which in turn stores versions A1, B2, C2, and D4 back onto physical storage medium 14.

A version controlled database may be used in various ways. When used in conjunction with an application that requires database access, a version controlled database may allow developers to modify or experiment with the contents of the database without disturbing the workflow of others using the database. For example, the RequisitePro® requirements management tool is an application that uses a database to store product requirements and information about product requirements. (RequisitePro is a registered trademark of International Business Machines Corporation in the United States, other countries, or both). If the RequisitePro tool were to use a version controlled database, a product developer may be able to experiment with product requirements without interrupting the product development work flow.

For example, a product development unit may be working on developing a new product, and may be using the RequisitePro tool to guide the development process. However, a product architect may want to experiment with the product requirements. If the RequisitePro tool were using a version controlled database, the product architect may create a private branch of some or all of the product requirements data in the version controlled database. The product architect could then experiment by changing the versions of data in his private branch, while the rest of the development team used the main versions of the product requirements data. When the product architect completed his or her experimentation, he or she could discard the changes or merge the changes back into the main versions of the product requirements data.

A number of implementations have been described. Nevertheless, it will be understood that various modifications may be made. Accordingly, other implementations are within the scope of the following claims.

What is claimed is:

1. A version controlled database program residing on a non-transitory computer readable medium, having a plurality of instructions stored thereon, which, when executed by a processor, cause the processor to perform operations comprising: defining a version object software layer residing in a server configured to:
　　read a data element from a version controlled database, wherein the version controlled database resides in a main physical storage medium of the server;
　　write the data element to a temporary physical storage medium, the temporary physical storage medium separate from a main physical storage medium of the version controlled database and separate from a client device associated with a user;
　　maintain one or more versions of at least one data element of the version controlled database on the temporary physical storage medium; and
　　provide, via one or more data views, access to the one or more versions of the data element stored on the temporary physical storage medium including the one or more versions of the at least one data element, wherein at least one of the one or more data views is configured to provide access to a version of a first data element stored on the temporary physical storage medium;
　　wherein the versions of the data element include one or more data views that display a particular version of the data element of the version controlled database stored on the temporary physical storage medium, wherein at least one of the one or more data views is configured to provide access to the version of the first data element stored on the temporary physical storage medium, wherein the first data element includes a plurality of versions stored on the main physical storage medium of the version controlled database,
　　wherein the at least one of the one or more data views is further configured to provide access to a version of a second data element stored on the temporary physical storage medium, wherein the second data element includes a plurality of versions stored on the main physical storage medium of the version controlled database, and wherein the first data element is distinct from the second data element;
　　perform a versioning-compatible save operation to store the data element to the version controlled database, wherein the versioning-compatible save operation saves the data element to the same location, or to a repeatable location within a file, on a physical disk, in a memory device or storage device; and
defining a database management software layer residing in a plurality of clients configured to:
　　read and write the data element to the version controlled database via reading and writing the data element to the version object software layer; and
　　provide a database access interface for accessing the data element stored on the temporary physical storage medium in the version controlled database.

2. The program of claim 1 wherein the version object software layer includes one or more data views that provide access to the versions of the data in the version controlled database.

3. The program of claim 2 wherein the database management software layer reads and writes to the version object software layer via the one or more data views.

4. The program of claim 1 wherein the version object software layer reads and writes the data to the physical storage medium by performing file I/O operations.

5. The program of claim 1 wherein the database management software layer reads and writes the data to the physical storage medium by performing versioning-compatible save operations that read and write the data to certain and repeatable locations.

6. The program of claim 1 wherein the database management software layer reads and writes the data to the version controlled database via file I/O operations sent to the version object software layer.

7. The program of claim 1 wherein the database management software layer reads and writes the data via raw I/O operations sent to a second physical storage medium, and wherein the second physical storage medium is used for temporary storage of the data in the version controlled database.

8. The program of claim 7 wherein the version object software layer further stores data tables of the version controlled database on the physical storage medium.

9. A method comprising:
defining, by a computing device, a version object software layer residing in a server configured to:
　　read a data element from a version controlled database, wherein the version controlled database resides in a main physical storage medium of the server;
　　write the data element to a temporary physical storage medium, the temporary physical storage medium separate from a main physical storage medium of the version controlled database and separate from a client device associated with a user;
　　maintain one or more versions of at least one data element of the version controlled database on the temporary physical storage medium; and
　　provide, via one or more data views, access to the one or more versions of the data element stored on the temporary physical storage medium including the one or more versions of the at least one data element, wherein at least one of the one or more data views is configured to provide access to a version of a first data element stored on the temporary physical storage medium;

wherein the versions of the data element include one or more data views that display a particular version of the data element of the version controlled database stored on the temporary physical storage medium, wherein at least one of the one or more data views is configured to provide access to the version of the first data element stored on the temporary physical storage medium, wherein the first data element includes a plurality of versions stored on the main physical storage medium of the version controlled database, wherein the at least one of the one or more data views is further configured to provide access to a version of a second data element stored on the temporary physical storage medium, wherein the second data element includes a plurality of versions stored on the main physical storage medium of the version controlled database, and wherein the first data element is distinct from the second data element;

perform a versioning-compatible save operation to store the data element to the version controlled database, wherein the versioning-compatible save operation saves the data element to the same location, or to a repeatable location within a file, on a physical disk, in a memory device or storage device; and defining, by the computing device, a database management software layer residing in a plurality of clients configured to:

read and write the data element to the version controlled database via reading and writing the data element to the version object software layer; and provide a database access interface for accessing the data element stored on the temporary physical storage medium in the version controlled database.

10. The method of claim 9 wherein the version object software layer includes one or more data views that provide access to the versions of the data in the version controlled database.

11. The method of claim 10 wherein the database management software layer reads and writes to the version object software layer via the one or more data views.

12. The method of claim 9 wherein the version object software layer reads and writes the data to the physical storage medium by performing file I/O operations.

13. The method of claim 9 wherein the database management software layer reads and writes the data to the physical storage medium by performing versioning-compatible save operations that read and write the data to certain and repeatable locations.

14. The method of claim 9 wherein the database management software layer reads and writes the data to the version controlled database via file I/O operations sent to the version object software layer.

15. The method of claim 9 wherein the database management software layer reads and writes the data via raw I/O operations sent to a second physical storage medium, and wherein the second physical storage medium is used for temporary storage of the data in the version controlled database.

16. The method of claim 15 wherein the version object software layer further stores data tables of the version controlled database on the physical storage medium.

* * * * *